United States Patent
Saeed et al.

(10) Patent No.: US 12,435,615 B2
(45) Date of Patent: Oct. 7, 2025

(54) AUTONOMOUS DOWNHOLE ROBOT TOOL STRING

(71) Applicant: SAUDI ARABIAN OIL COMPANY, Dhahran (SA)

(72) Inventors: Abubaker Saeed, Dhahran (SA); Joey Palmowski, Brooklyn, NY (US); Boleslaw Mellerowicz, Brooklyn, NY (US); Isabel King, Brooklyn, NY (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 247 days.

(21) Appl. No.: 18/446,292

(22) Filed: Aug. 8, 2023

(65) Prior Publication Data
US 2025/0052148 A1   Feb. 13, 2025

(51) Int. Cl.
*E21B 47/00* (2012.01)
*E21B 41/04* (2006.01)
(Continued)

(52) U.S. Cl.
CPC .............. *E21B 47/00* (2013.01); *E21B 41/04* (2013.01); *E21B 47/16* (2013.01); *G01N 29/221* (2013.01);
(Continued)

(58) Field of Classification Search
CPC .......... E21B 41/04; E21B 47/00; E21B 47/16; G01N 29/221; G01N 29/225; G01N 29/265; G01V 1/52; G10K 11/35
See application file for complete search history.

(56) References Cited

U.S. PATENT DOCUMENTS

| 4,255,798 A | 3/1981 | Havira |
| 4,665,511 A | 5/1987 | Rodney et al. |

(Continued)

FOREIGN PATENT DOCUMENTS

| CN | 111608644 B2 | 9/2021 |
| EP | 0671547 B1 | 1/1999 |

(Continued)

OTHER PUBLICATIONS

International Search Report and Written Opinion in Corresponding PCT Application No. PCT/US2024/040719 mailed Nov. 15, 2024; 12 pages. 2024.

(Continued)

*Primary Examiner* — Daniel P Stephenson
(74) *Attorney, Agent, or Firm* — Leason Ellis LLP

(57) ABSTRACT

An autonomous downhole robot tool string configured for navigating and collecting information in a downhole environment comprises a sensor head having a cylindrical housing positioned at a distal end of the tool string which includes a wobbler ultrasonic transducer with a tubular structure housing an ultrasonic transducer wherein the tubular structure is tiltable about the shaft, and wherein the distal end of the sensor head is mounted for panned movement about the longitudinal axis providing two degrees of freedom for the wobbler ultrasonic transducer. First and second caliper ultrasonic transducers are positioned on the cylindrical housing facing the downhole environment, each caliper transducers is configured to pan about an axis orthogonal to the longitudinal axis of the tool string. An electronics bay section coupled to the sensor head includes electronic circuits for controlling components of the sensor head.

20 Claims, 14 Drawing Sheets

(51) Int. Cl.
*E21B 47/16* (2006.01)
*G01N 29/22* (2006.01)
*G01N 29/265* (2006.01)
*G01V 1/52* (2006.01)
*G10K 11/35* (2006.01)

(52) U.S. Cl.
CPC ......... *G01N 29/225* (2013.01); *G01N 29/265* (2013.01); *G01V 1/52* (2013.01); *G10K 11/35* (2013.01)

(56) References Cited

U.S. PATENT DOCUMENTS

| | | | |
|---|---|---|---|
| 4,991,441 A | 2/1991 | Nottingham et al. | |
| 5,159,578 A | 10/1992 | Lenhardt et al. | |
| RE34,975 E | 6/1995 | Orban et al. | |
| 6,036,646 A * | 3/2000 | Barthe | A61B 8/4461 |
| | | | 600/443 |
| 6,366,531 B1 | 4/2002 | Varsamis et al. | |
| 6,378,627 B1 | 4/2002 | Tubel et al. | |
| 6,755,263 B2 | 6/2004 | Alft et al. | |
| 6,845,819 B2 | 1/2005 | Barrett et al. | |
| 7,069,124 B1 | 6/2006 | Whittaker et al. | |
| 7,150,318 B2 | 12/2006 | Freeman | |
| 7,322,416 B2 | 1/2008 | Burris, II et al. | |
| 8,024,066 B2 | 9/2011 | Reverte et al. | |
| 10,656,298 B2 * | 5/2020 | Leonard | G01N 29/00 |
| 10,753,201 B2 | 8/2020 | Logan et al. | |
| 11,525,350 B2 * | 12/2022 | Breaux | G01V 1/46 |
| 12,044,120 B2 * | 7/2024 | Saeed | E21B 47/09 |
| 12,078,058 B2 * | 9/2024 | Tiwari | G01V 1/52 |
| 2006/0067162 A1 | 3/2006 | Blankinship et al. | |
| 2007/0062290 A1 | 3/2007 | Roh et al. | |
| 2011/0319768 A1 * | 12/2011 | Saito | G10K 11/30 |
| | | | 600/472 |
| 2014/0301164 A1 | 10/2014 | Mandal | |
| 2020/0271812 A1 | 8/2020 | Leonard | |
| 2022/0003111 A1 | 1/2022 | Saeed et al. | |
| 2025/0052148 A1 * | 2/2025 | Saeed | G01V 1/52 |

FOREIGN PATENT DOCUMENTS

| | | | | |
|---|---|---|---|---|
| GB | 2177208 A | | 1/1987 | |
| WO | WO-2013081608 A1 * | 6/2013 | | G01V 1/52 |
| WO | WO-2024103159 A1 * | 5/2024 | | A61N 7/02 |
| WO | WO-2025034555 A1 * | 2/2025 | | E21B 41/04 |

OTHER PUBLICATIONS

Schlumberger; Advance borehole imaging independent of mud type; https://www.slb.com/products-and-services/innovating-in-oil-and-gas/reservoir-characterization/surface-and-downhole-logging/wireline-openhole-logging/ultrasonic-borehole-imager; Jun. 2002; 12 pages.

Schlumberger; TerraSphere; https://www.slb.com/products-and-services/innovating-in-oil-and-gas/drilling/surface-and-downhole-logging/logging-while-drilling-services/terrasphere-high-definition-dual-imaging-while-drilling-service; Retrieved Aug. 23, 2023, 5 pages.

Baker Hughes; Ultrasonicxplorer; https://www.bakerhughes.com/integrated-well-services/integrated-well-construction/evaluation/wireline-openhole-logging/wireline-imaging/ultrasonicxplorer-imaging-service; Retrieved Aug. 23, 2023; 4 pages.

CSIRO; Autonomous and wireless downhole robot; https://www.youtube.com/watch?v=FyE9KNQOab4&t; Apr. 27, 2012.

Behzad Elahifar; Wellbore Instability Detection in Real Time Using Ultrasonic Measurements; https://pure.unileoben.ac.at/portal/files/2314917/AC10927554n01.pdf; Mar. 2013; 125 pages.

* cited by examiner

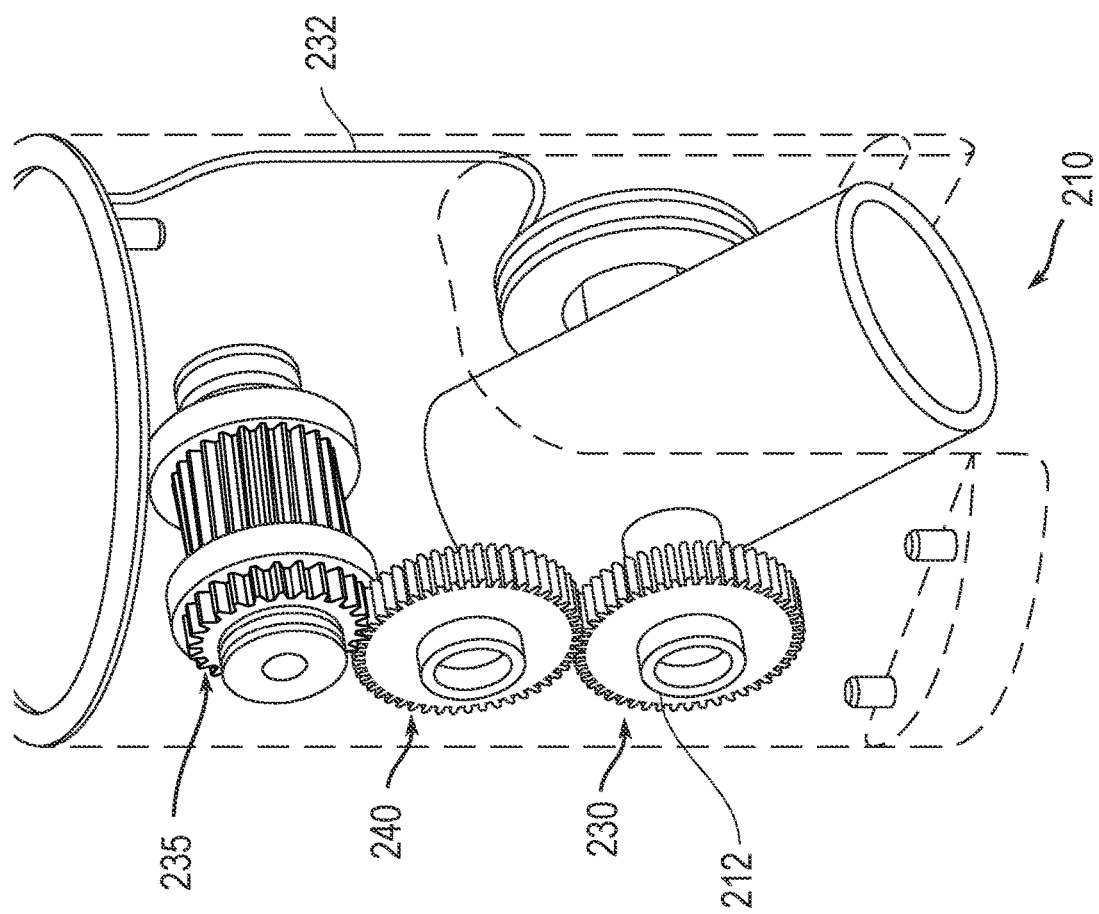

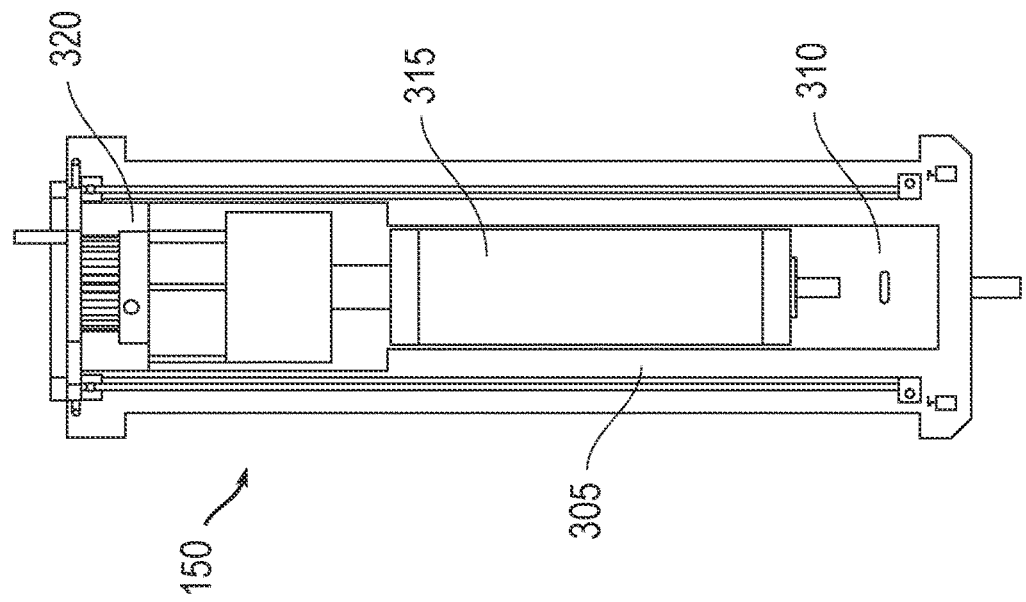
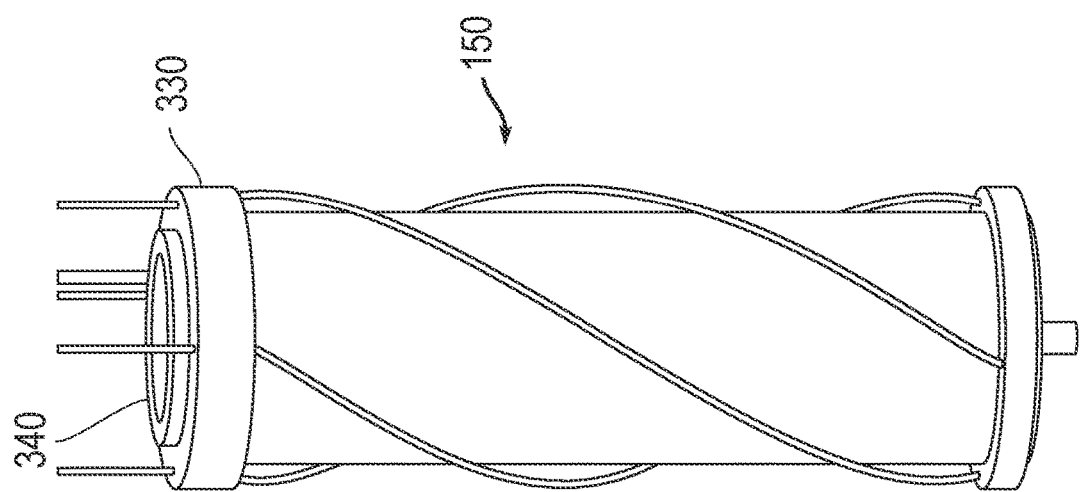
FIG. 7B
FIG. 7A

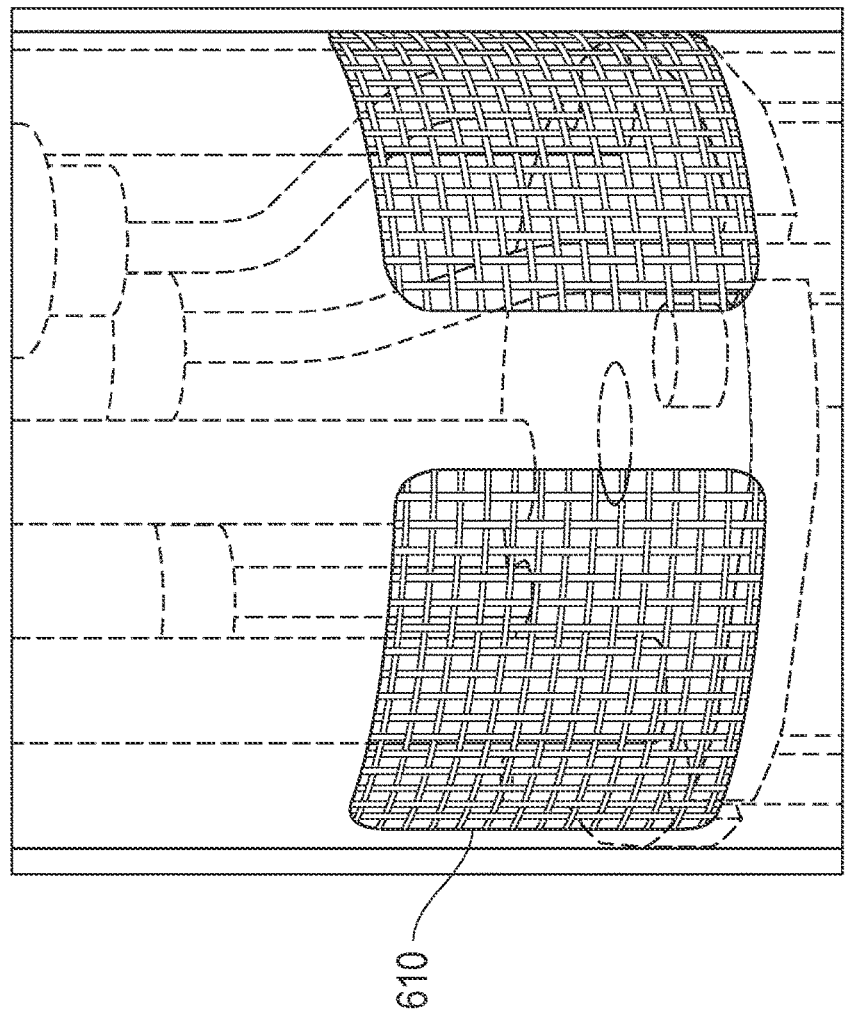
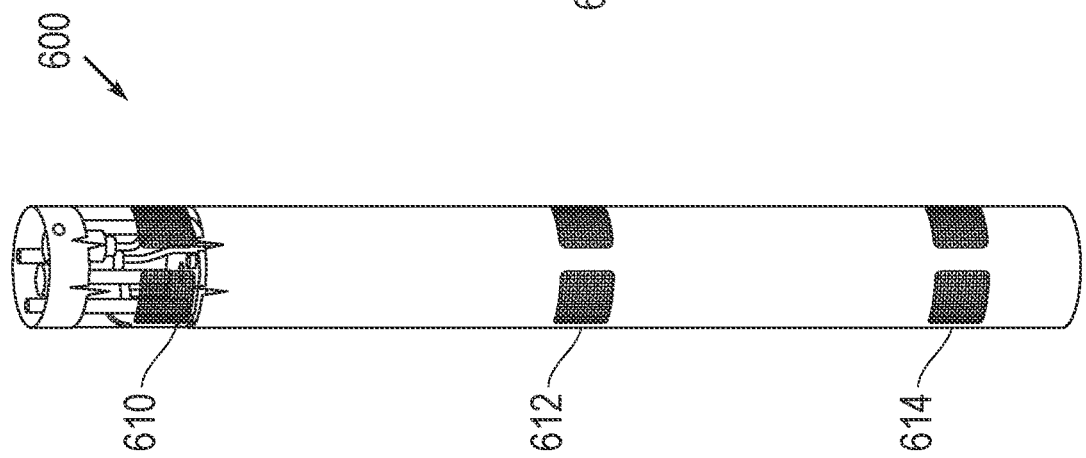
FIG. 11A
FIG. 11B

AUTONOMOUS DOWNHOLE ROBOT TOOL STRING

FIELD OF THE DISCLOSURE

The present disclosure relates to geological testing and monitoring systems, and more particularly relates to an autonomous downhole robot tool string that includes ultrasonic sensors.

BACKGROUND OF THE DISCLOSURE

The oil and gas industry uses well tool strings for navigation, diagnostic and mapping purposes. The tool strings incorporate a variety of sensors, including ultrasonic and electromagnetic sensors which transmit and receive radiation in the downhole environment. Analysis of this information is used to determine the geometry of the production tubing, casing and geological features downhole, and a detailed three-dimensional mapping of the well environment can be generated from this data.

While a variety of tool strings have been developed in the industry, including autonomous robots, there remains a need to improve the robustness and accuracy of sensor designs used in the tool string to ensure the corresponding accuracy of the geological data derived from the signals detected by the sensors.

SUMMARY OF THE DISCLOSURE

In one aspect, the present disclosure describes an autonomous downhole robot (ADR) tool string having an extended longitudinal axis that is configured for navigating and collecting information in a downhole environment. The ADR tool string comprises a sensor head having a cylindrical housing positioned at a distal end of the tool string. The sensor head includes a wobbler ultrasonic transducer comprising a tubular structure housing an ultrasonic transducer, the tubular structure is coupled to a distal end of the sensor head via a shaft oriented orthogonally to the longitudinal axis of the tool string wherein the tubular structure is tiltable about the shaft, and wherein the distal end of the sensor head is mounted for panned movement about the longitudinal axis providing two degrees of freedom for the wobbler ultrasonic transducer. The sensor head also includes first and second caliper ultrasonic transducers positioned on the cylindrical housing facing the downhole environment, each caliper transducer is configured to pan about an axis orthogonal to the longitudinal axis of the tool string. An electronics bay section coupled to the sensor head includes electronic circuits for controlling components of the sensor head.

In another aspect, the present disclosure describes an autonomous downhole robot (ADR) tool string that comprises a sensor head having a cylindrical housing positioned at a distal end of the tool string. The sensor head includes: a) a transducer housing assembly positioned at a distal end of the tool string including a wobbler ultrasonic transducer having two degrees of freedom for tilting and panning and first and second caliper ultrasonic transducers having a single degree of freedom for panning; b) a tilt motor housing assembly coupled adjacent to the transducer housing assembly including a tilt motor that is operable to tilt the wobbler transducer; c) a pan motor housing assembly coupled adjacent to the tilt motor housing assembly including a pan motor that is operable to pan the wobbler transducer and the first and second caliper transducers; and d) a bellows assembly coupled adjacent to the pan motor housing assembly including a bellows that is operable to balance pressure within the sensor head.

These and other aspects, features, and advantages can be appreciated from the following description of certain embodiments and the accompanying drawing figures and claims.

BRIEF DESCRIPTION OF THE DRAWINGS

FIG. 4A shows a first enlarged section of the embodiment of the transducer housing assembly shown in FIG. 3B

FIG. 7A is frontal view of an embodiment of a tilt motor assembly of an ADR tool string according to the present disclosure.

FIG. 7B is a cross-sectional view of the embodiment of the tilt motor housing shown in FIG. 7A.

FIG. 11A shows an embodiment of the outer housing of the sensor head of the ADR tool string according to the present disclosure illustrating placements of vents and filters.

FIG. 11B shows an embodiment of a vent for the outer housing of the sensor head shown in FIG. 11A.

DETAILED DESCRIPTION OF CERTAIN EMBODIMENTS OF THE DISCLOSURE

The present disclosure describes an autonomous downhole robot (ADR) tool string that is designed for downhole well navigation, diagnostics, and 3D mapping. To accomplish this, the ADR leverages two self-calibrating ultrasonic sensors, referred to as "caliper" sensors and a "wobbler" sensor (three sensors over all). The caliper sensor operates along a single degree of freedom and is capable of panning 360 degrees. The wobbler sensor operates along two degrees of freedom and is capable of tilting between-90 and 90 degrees while also capable of panning 360 degrees. The ultrasonic sensors are capable of scanning features in the downhole environment including production tubing, casing, and geological features. Calibration can occur between either one of the caliper sensors and the wobbler sensor using a known distance between the faces of a caliper transducer and the wobbler transducer when pointed in toward the same target. The difference in time-of-flight for each sensor can be used to determine the speed of sound in the medium and calibrate the system. The wobbler sensor is also configured to perform forward sensing for obstacle detection and odometry measurements. The sensor head 110 also includes multiple pressure transducers and temperature sensors for additional real-time, downhole telemetry.

Figure 1:
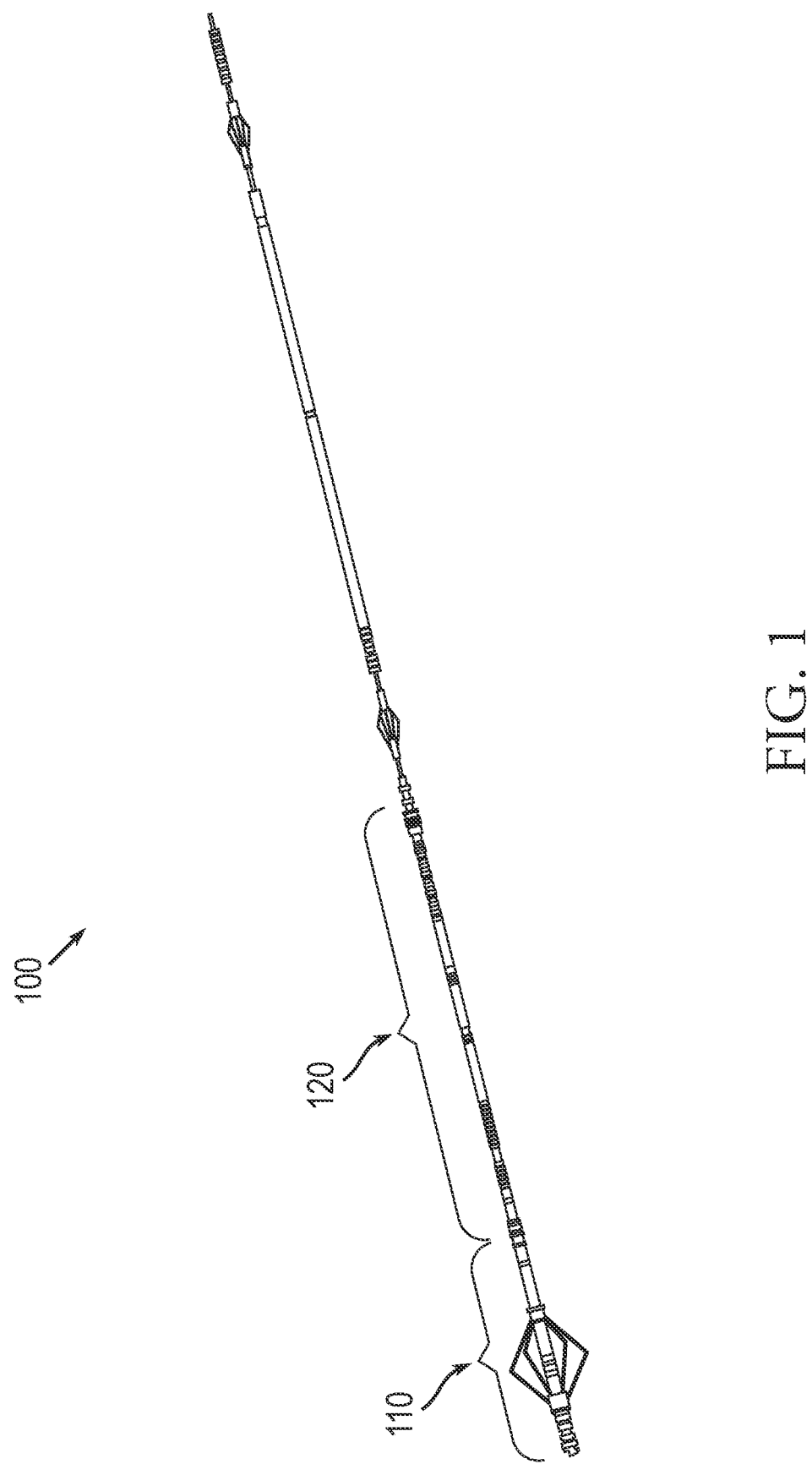
FIG. 1 is a perspective view of an embodiment of an autonomous downhole robot (ADR) tool string according to the present disclosure. s

FIG. 1 is a perspective view of an embodiment of an autonomous downhole robot (ADR) tool string according to the present disclosure. The tool string 100 extends longitudinally and includes a sensor head 110 at a distal end. The sensor head 110 includes ultrasonic transducers (described more fully below) as well as pressure transducers and temperature sensors. The ultrasonic sensors have multiple degrees of freedom and are capable of scanning the downhole environment to identify features such as production tubing, casing as well as open-hole geological features in real-time. At least one of the ultrasonic sensors is configured to forward sensing for obstacle detection and odometry measurements. The pressure transducers and temperature sensors provide additional, real-time downhole telemetry. The tool string 100 further includes an electronic bay section 120 that is positioned longitudinally adjacent to the sensor head 110.

Figure 2A:
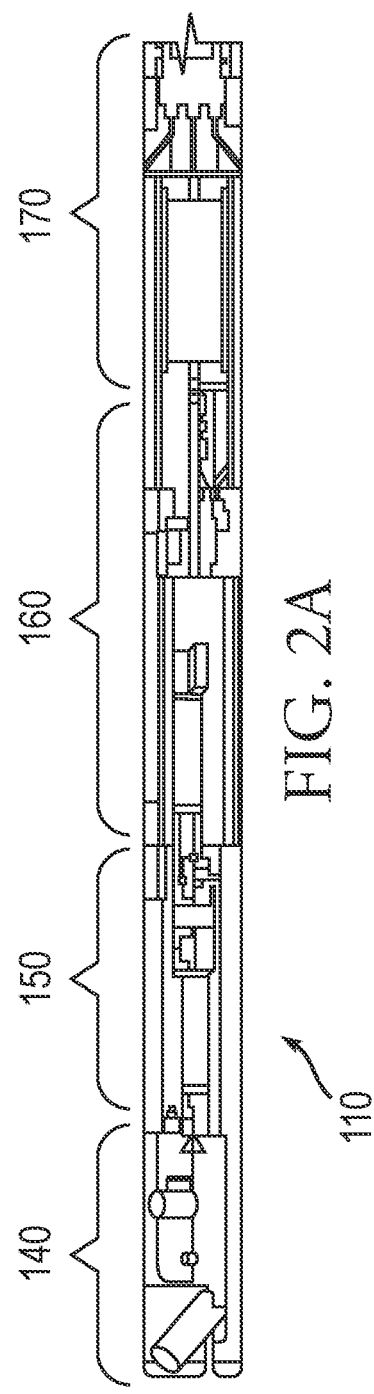
FIGS. 2A, 2B and 2C are respective cross-sectional, plan and cut-away views of an embodiment of the ADR tool string sensor head according to the present disclosure.
Figure 2B:
Figure 2C:
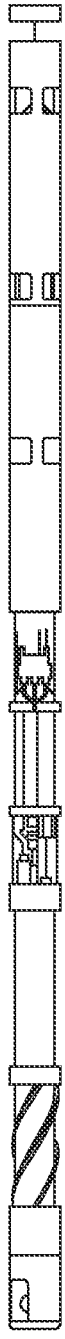
Figure 3B:
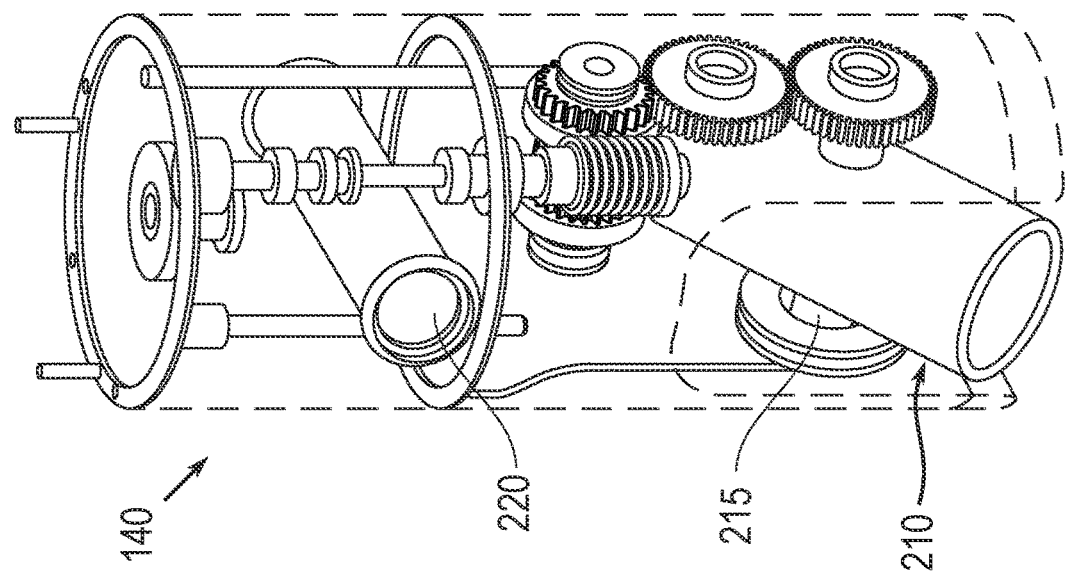
FIGS. 3A and 3B show external and internal perspective views of an embodiment of a transducer housing assembly according to the present disclosure.
Figure 3A:
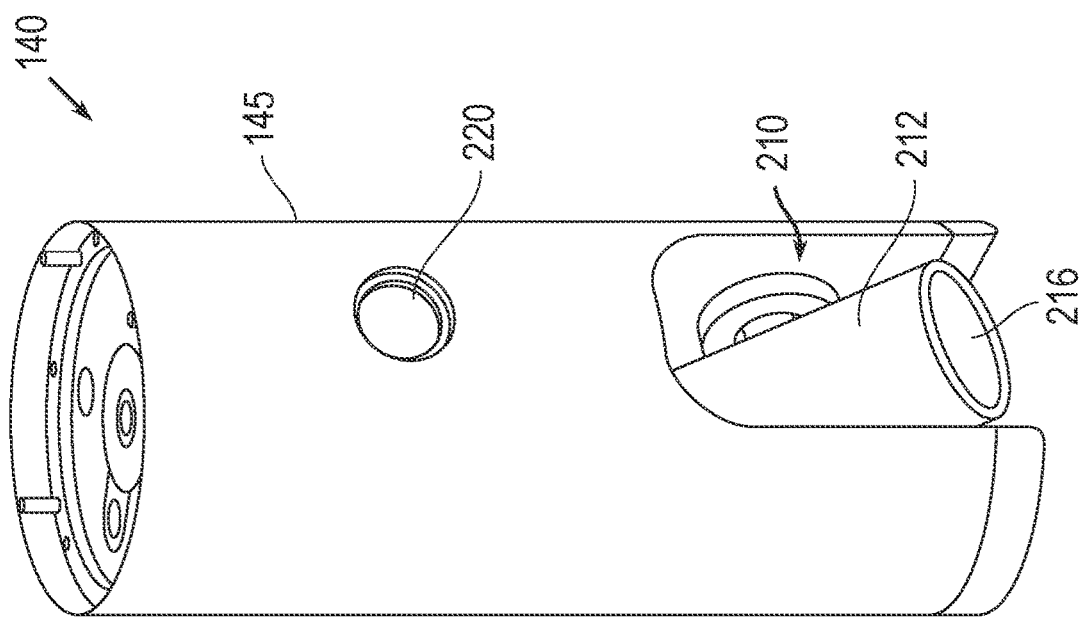
Figure 3C:
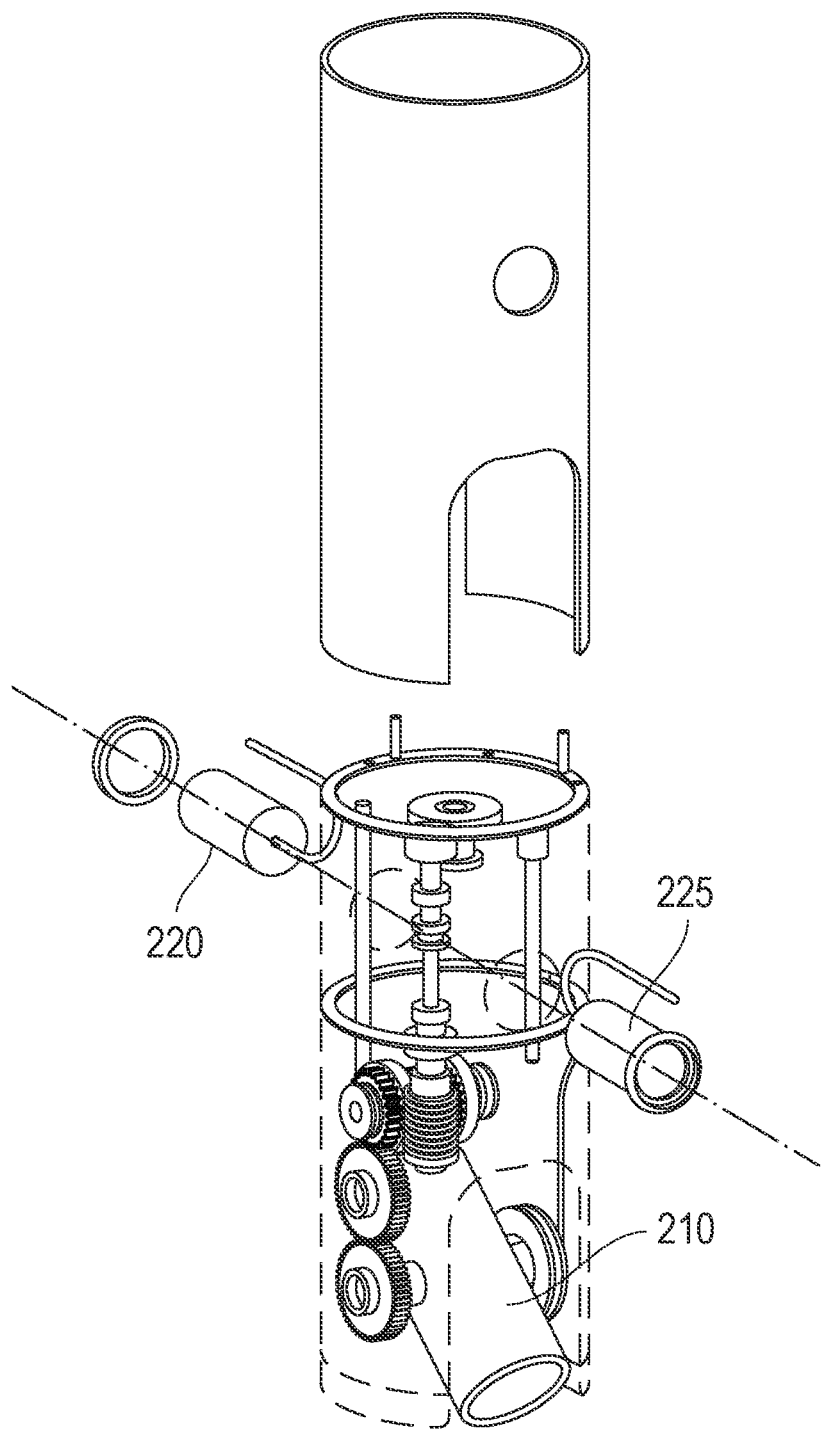
FIG. 3C is another perspective view of the embodiment of the transducer housing assembly of the ADR tool string shown in FIGS. 3A and 3B that illustrates both caliper ultrasonic sensors according to an embodiment of the present disclosure.

FIGS. 2A, 2B and 2C are respective cross-sectional, plan and cut-away views of an embodiment of the ADR tool string sensor head 110 according to the present disclosure. As shown particularly in FIG. 2A, the sensor head 110 includes several sub-assemblies including a transducer housing assembly 140, a tilt-motor housing assembly 150, a pan motor housing assembly 160 and a bellows assembly 170. FIG. 3A is an external perspective view of an embodiment of the transducer assembly 140. FIG. 3B is a perspective view of the transducer assembly that shows internal components of the assembly. As indicated, the transducer housing assembly 140, which is positioned at the distal end of the sensor head 110, comprises a cylindrical housing 145 that includes the wobbler ultrasonic transducer 210, and caliper ultrasonic transducers 220, 225 (both caliper ultrasonic transducers are shown in the perspective view shown in FIG. 3C). As shown, the wobbler transducer 210 is mounted on its own cylindrical sub-housing 212 and is pivotable about a shaft 215 extends through the sub-housing in a direction perpendicular to the longitudinal (z) axis of the housing. The wobbler transducer 210 is positioned at the end of the sub-housing 212. As shown in FIG. 3C, the caliper transducers 220, 225 can pan 360 degrees about an axis orthogonal to the main longitudinal (z) axis.

Figure 4B:
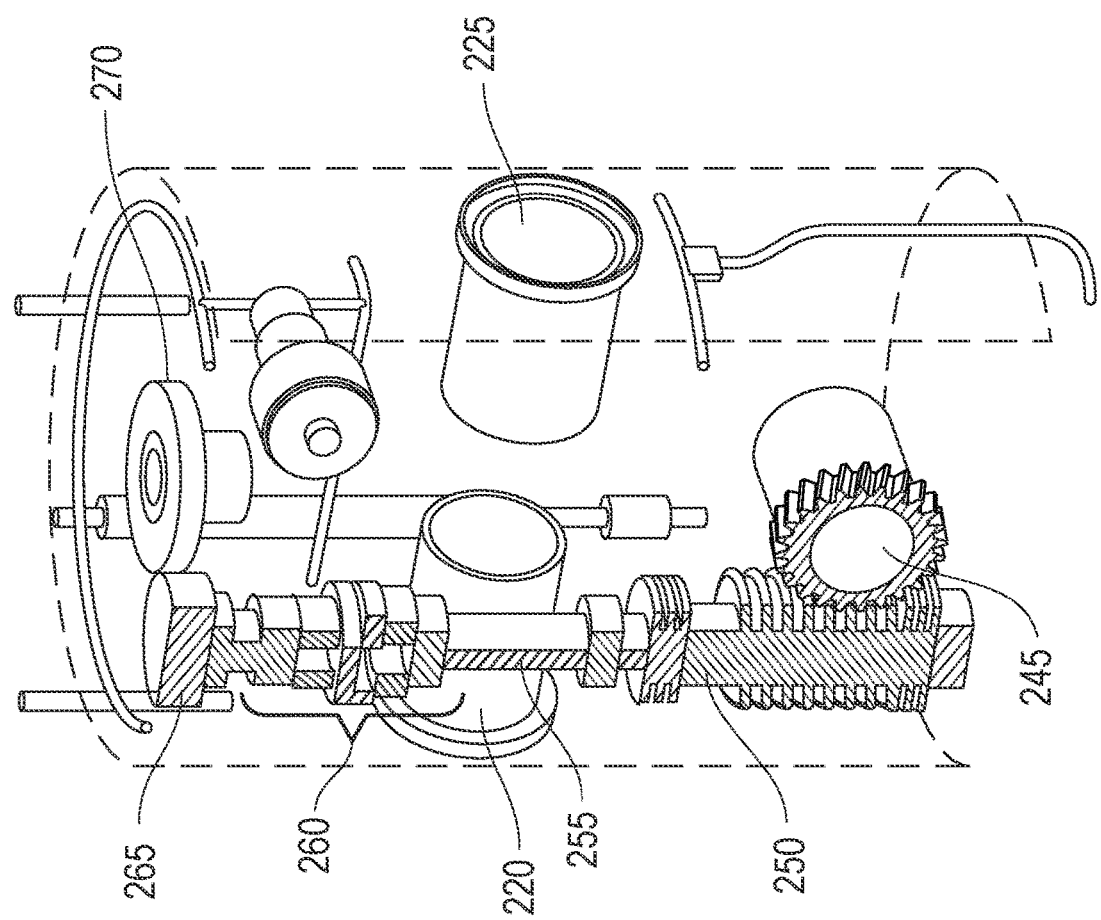
FIG. 4B shows a second enlarged section of the embodiment of the transducer housing assembly shown in FIG. 3B.

The transducer housing assembly 140 also includes drivetrain components for actuating the wobbler transducer 210 which are shown in FIGS. 4A and 4B. The drivetrain components enable the controlled tilting and panning motion of the wobbler transducer 210. As shown in FIG. 4A, the rotating shaft 212 of the wobbler transducer 210 is coupled to an output spur gear 230. The shaft 212 is mounted to the housing using a dry-running sleeve bearing, which is exposed to the external environment. In this embodiment, wiring 232 for conveying transducer signals exits through the bearings and runs up alongside of the transducer housing, with clearance for mobility. On an internal side, the shaft 212 is mounted to the transducer housing 140 via a radial ball bearing and a rotary O-ring that prevents ingress along the rotating interface. The output spur gear 230 is engagingly coupled to an input spur gear 235 via an idler spur gear 240 that creates additional separation between the wobbler transducer 210 and the transducer housing 140, allowing for a larger range of motion. As shown in FIG. 4B, the input spur gear 235 is coupled to a shaft supported by radial ball bearings and a worm output gear 245.

The worm output gear 245 is driven by a worm 250 coupled to shaft 255 that extends along the longitudinal axis. Positioned along this axis are needle roller thrust bearings for reacting to thrust load in either direction, radial ball bearings for radial shaft support, and an Oldham coupler 260 for misalignment compensation. Coupled to the end of the shaft 255 is an additional axis tilt spur gear 265 that can be coupled to a spur pinion 270. This tilt axis spur gear 265 and pinion 270 combination can be controlled to relocate the drivetrain along a more centrally located axis with respect to the ADR tool-string longitudinal axis. It was found that the axis tilt spur great 265 aids in providing the space required for the wobbler actuation drivetrain. In the depicted implementation, the input spur gear 265 is mounted to the transducer housing 140 body via radial ball bearing.

Figure 5A:
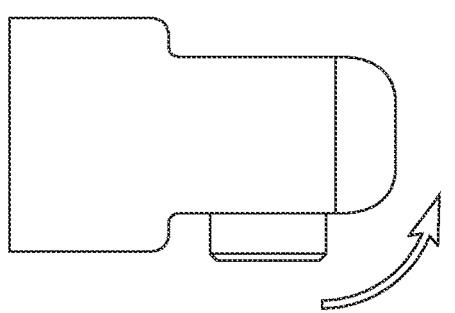
FIGS. 5A to 5C show a sequence of different tilt positions of the wobbler ultrasonic transducer according to the present disclosure.
Figure 6A:
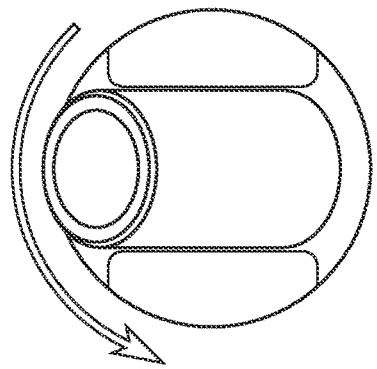
FIG. 6A to 6C show a sequence of different panning positions of the wobbler ultrasonic transducer according to the present disclosure.
Figure 5B:
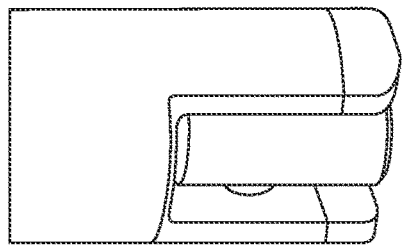
Figure 6B:
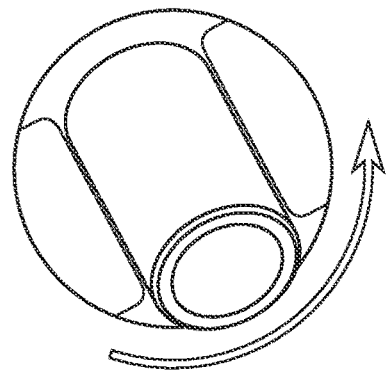
Figure 5C:
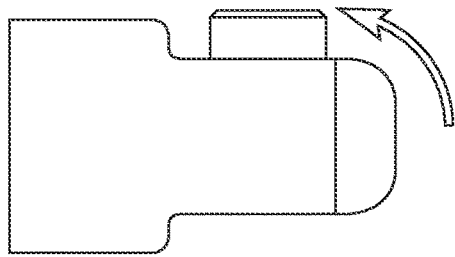
Figure 6C:
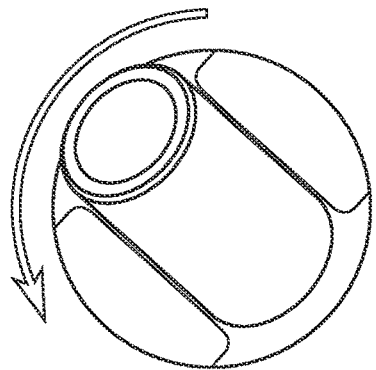

FIGS. 5A-5C illustrate how the wobbler transducer can be controllably tilted to direct ultrasonic waves at a selected angle to obtain information about the downhole environment. In particular FIG. 5A depicts wobbler transducer at zero-degree position, FIG. 5B shows the wobbler at a 90 degree position and FIG. 5C shows the wobbler tilted at a 180 degree position. The sequence from FIG. 5A to FIG. 5C illustrates the 180 degree range of titling motion available for the wobbler transducer. FIGS. 6A-6C illustrate how the wobbler transducer can also be panned (rotated on its axis) at a selected position. FIG. 6A-6C shows the wobbler transducer at respective t zero degree, 120 degree, and 330 degree positions, respectively, illustrating the 360 degree panning range of motion.

This transducer housing also contains two additional ultrasonic transducers referred to as the "caliper" transducers" 220, 225. The caliper transducers 220, 225 are rigidly mounted along a central plane orthogonal to the longitudinal axis of the ADR tool string and are exposed to the external environment. A tubular housing slides over the outside of the assembly, holding the caliper transducers 220, 225 in place. The caliper sensors operate along a single degree of freedom and are capable of panning 360 degrees around their respective orthogonal axes. This panning motion is schematically illustrated in FIG. 3C.

FIGS. 7A and 7B illustrate frontal and cross-sectional views of an embodiment of the tilt motor housing assembly 150 which is positioned adjacent to and coupled to the transducer housing assembly 140. As shown in these figures, the tilt motor assembly 150 comprises a cylindrical housing 305 in which a planetary gear head 310, a tilt motor 315, and a positioning sensor (not shown) are situated. The positioning sensor detects a current tilt position of the wobbler transducer. Signals generated by positioning sensor are used to control the tilt axis of the wobbler transducer.

Figure 7C:
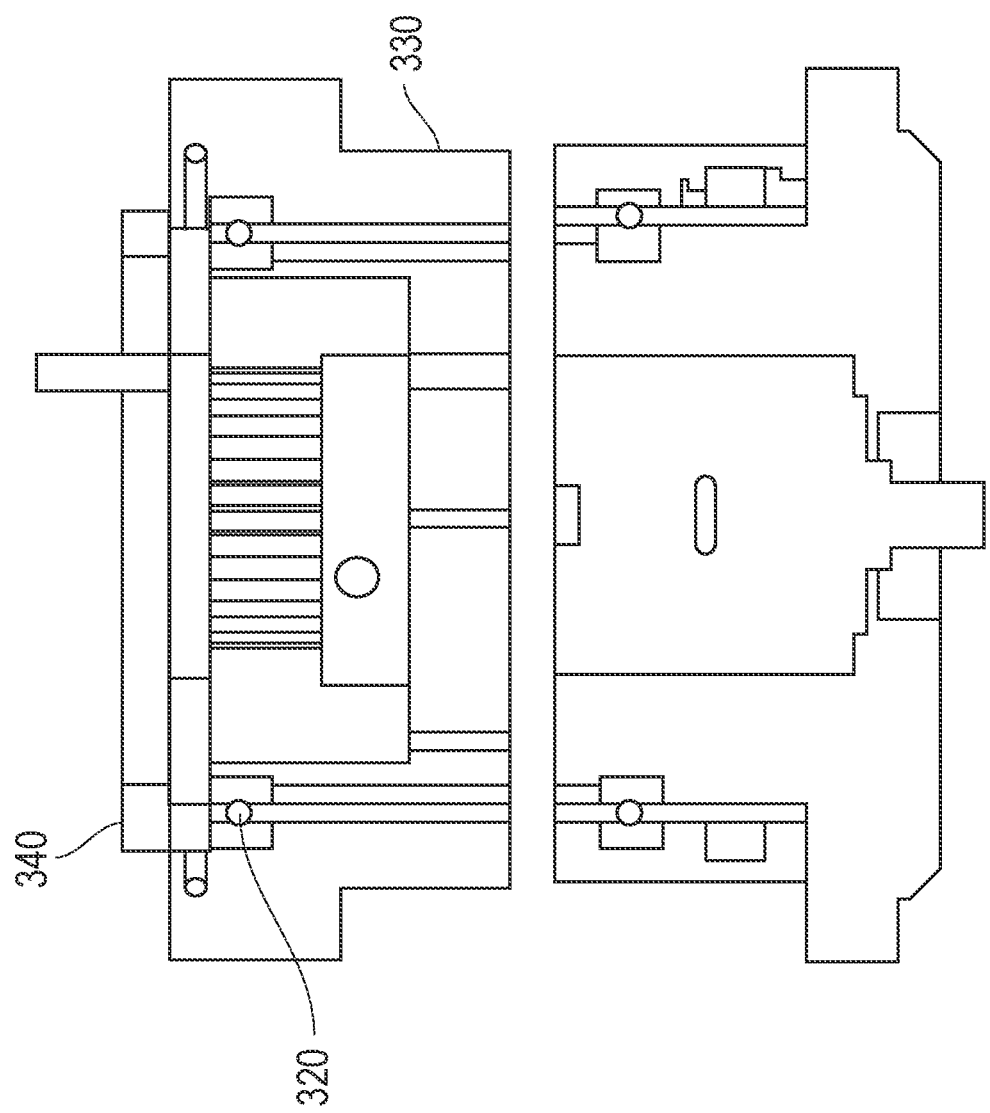
FIG. 7C is a cut-through, detailed view of the top and bottom portion of the tilt motor housing assembly shown in FIG. 7B.

The tilt motor 315 is coupled via the planetary gear head 310 to the shaft of the input spur gear 245 of the transducer housing assembly. At the opposite, proximal, end of the tilt motor assembly, an additional pan axis internal spur gear 320 is rigidly mounted. The internal spur gear 320 transfers force along the pan axis providing for panning of the wobbler and caliper transducers. FIG. 7C, which is a cut-through enlarged view of the top portion of the tilt motor housing assembly shown in FIG. 7B, depicts the internal spur gear 320 in greater detail. An outer chassis 330 is mounted to the tilt motor housing via a lower four-point contact ball bearing and upper radial ball bearing. A rotary O-ring 340 is positioned between the chassis and the motor housing at a lower end to prevent ingress along the rotating interface. Wiring from the transducers in the transducer housing assembly is run along the outside of the outer chassis 330.

Figure 8B:
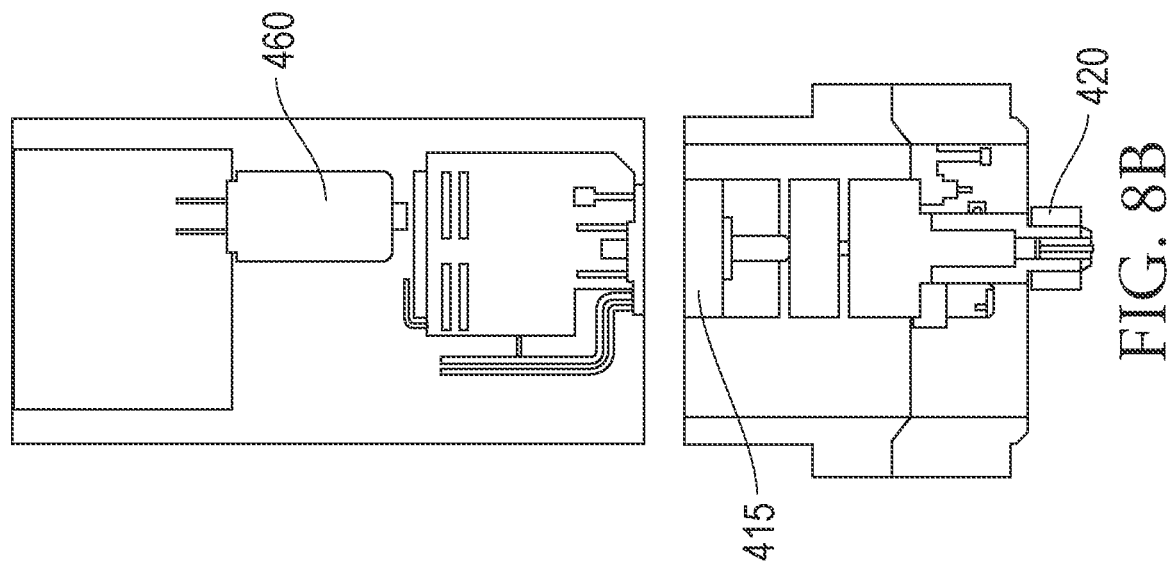
FIG. 8B is a cut-through, detailed section of the top and bottom of the pan motor housing assembly shown in FIG. 8A.
Figure 8A:
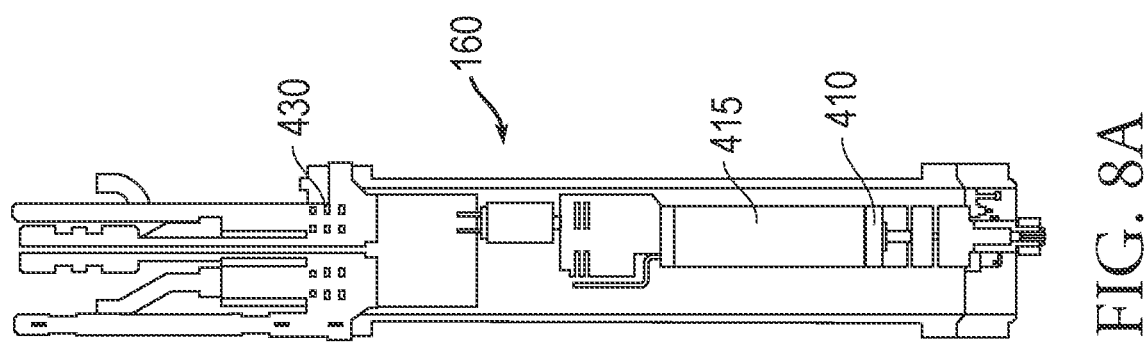
FIG. 8A is a cross-sectional view of an embodiment of a pan motor housing assembly of the ADR tool string according to the present disclosure.
Figure 9:
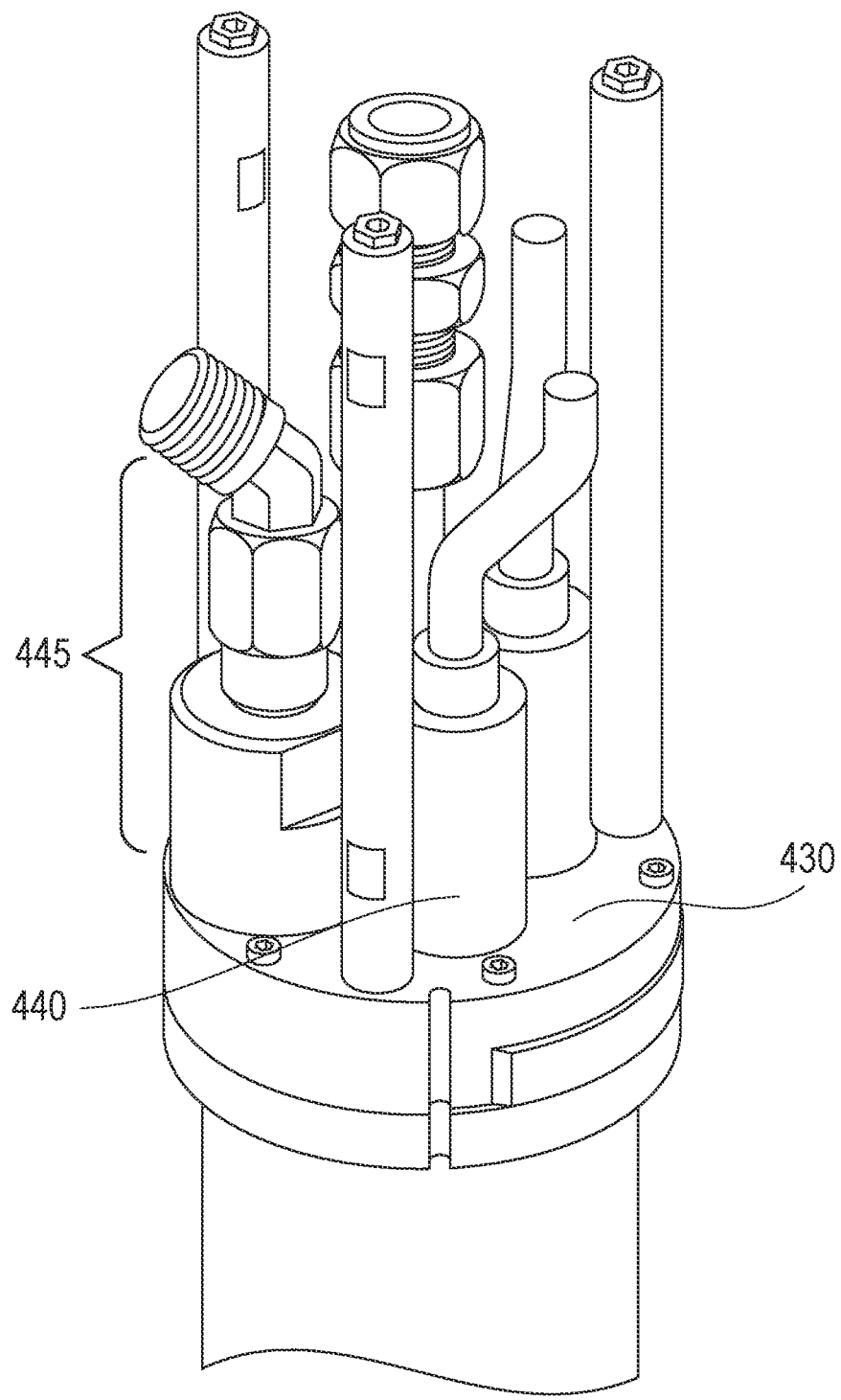
FIG. 9 is an enlarged perspective view of the end cap of the embodiment of the pan motor assembly shown in FIGS. 8A and 8B.

Turning now to FIG. 8A, a cross-sectional view of an embodiment of a pan motor housing assembly 160 according to an embodiment of the present disclosure is shown. FIG. 8B shows a cut-through enlarged section of the pan motor housing assembly shown in FIG. 8A. The pan motor housing assembly 160 is positioned adjacent and coupled to the tilt motor assembly toward the proximal end of the tool string. The pan motor assembly 160 includes a planetary gear head 410, a pan motor 415, and an additional positioning sensor (not shown). The positional sensor of the pan motor assembly generates signals that are used for controlling the panning movement of the wobbler and caliper transducer components. The planetary gearhead 410 has an output shaft that is coupled to a pinion spur gear 420 which meshes with the pan axis internal spur gear 320 of the tilt motor assembly 150. An end cap 430 is positioned at the proximal end of the pan motor assembly. FIG. 9 is an enlarged perspective view of the end cap 430. As shown, the end cap 430 includes high-pressure/high-temperature electrical feedthroughs 440, a vacuum/oil-filling valve 445, and a stem extrusion 450 for connection to a pressure balancing bellow of the bellows assembly 170. The pan motor housing also includes a pressure transducer 460 positioned below the end cap 430. The pressure transducer measures the internal pressure of the sensor head, which is the oil pressure created by the pressure balancing bellow. Both the tilt motor housing assembly 150 and the pan motor housing assembly 160 include cabling route from a moving section to a non-moving section. Since the range of motion of the cable is 360 degrees or less, a slip-ring or twist capsule can be avoided and instead the cabling can be accomplished with careful routing with enough service loop to take up the motion.

Figure 10B:
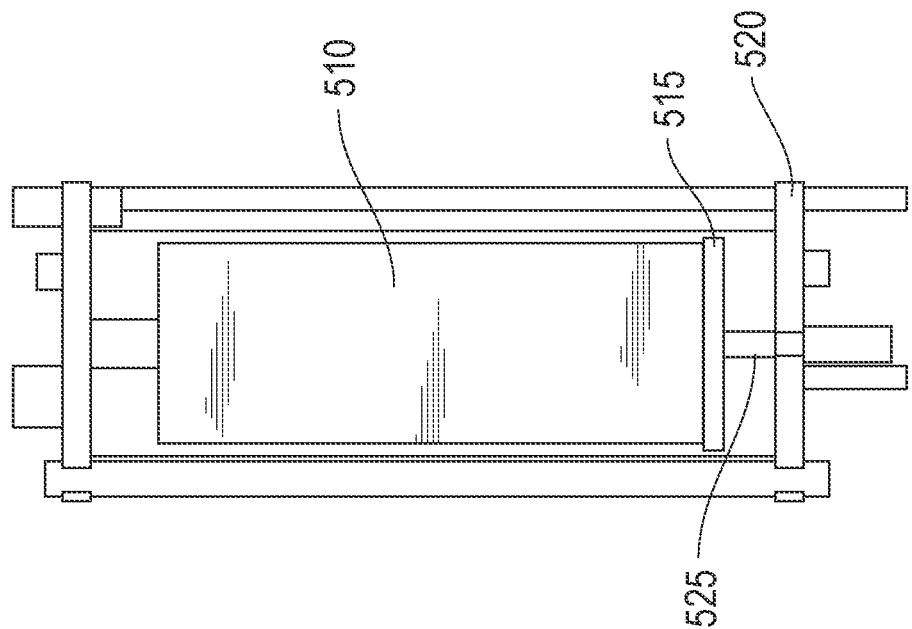
FIG. 10B is an enlarged view of a middle section of the bellows assembly shown in FIG. 10A.
Figure 10A:
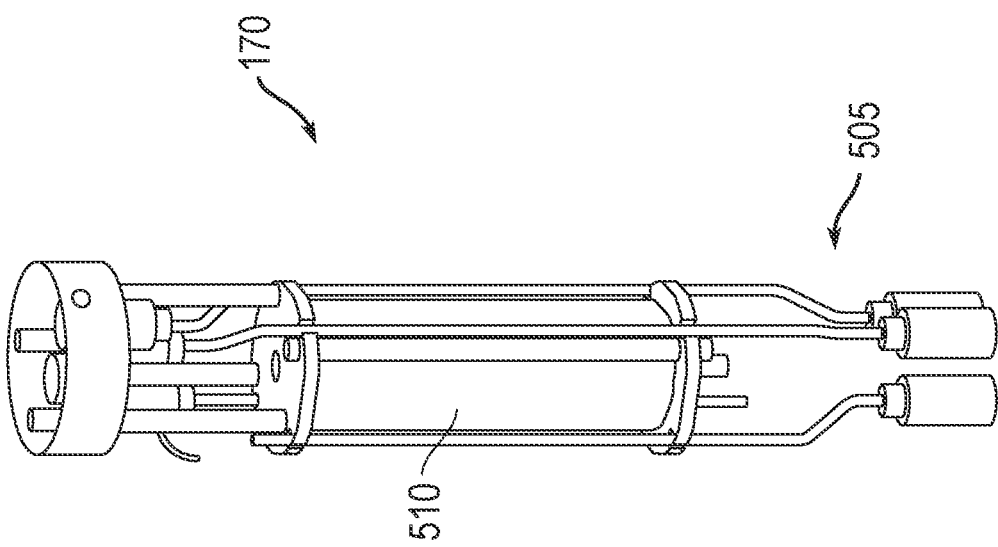
FIG. 10A is a perspective view of an embodiment of a bellows assembly of the ADR tool string according to the present disclosure.

FIG. 10A shows a perspective view of an embodiment of a bellows assembly according to the present disclosure. The bellows assembly 170 balances internal oil pressure with external well multi-phase flow within the sensor head. FIG. 10B is an enlarged via of a middle section of the bellows assembly 170. The bellows assembly 170 is a cylindrical assembly that is coupled rigidly to the end cap 430 of the pan motor assembly 160 using support rods. In the embodiment depicts the bellows assembly is coupled to the end cap of the pan motor assembly using three equally-spaced support rods. At the center of the bellows assembly 170 is a pressure-balancing bellow weldment 510. At an outlet of the lower end of the bellow weldment 510 is a stainless steel wire cloth mesh filter 515 which is held in place by a rigidly connected end cap 520 having a stem extrusion 525 that connects to a mating component of the pan motor assembly via, for example, a compression fitting.

Figure 10C:
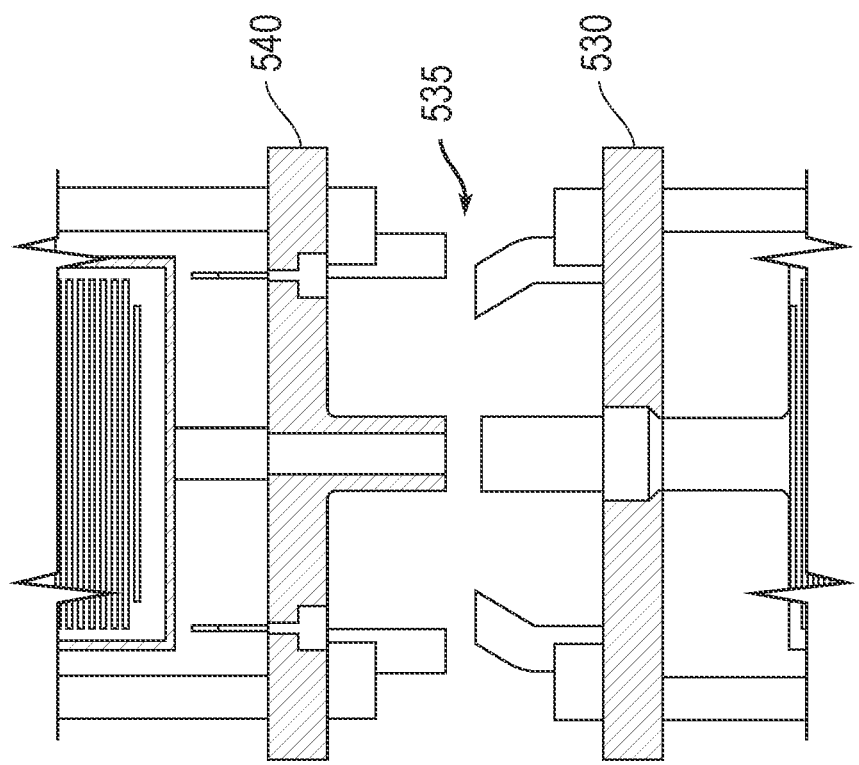
FIG. 10C is an enlarged view of an upper and lower section of the bellows assembly shown in FIG. 10A.

The upper section of bellows assembly 170, shown in FIG. 10C includes a lower end cap 530 and an upper end cap 540. Mounted to the top side of the lower end cap 530 are another set of three equally spaced support rods 545 that extend to the top end of the bellow weldment and mount to the upper end cap 540 that geometrically mates with the top of the bellow weldment 510, effectively securing it in place. Another set of support rods is mounted to the top side of the upper end cap 540 that extend beyond the bellow weldment, creating open space for electrical connectors and service loop.

An outer housing for the tilt motor housing assembly 150, the pan motor housing assembly 160, and the bellows assembly can slide along the outside the second, third, and fourth respective assemblies. FIG. 11A shows an embodiment of such an outer housing 600. The outer housing 600 provides a protective layer between the routed wiring and the external environment. One or more welded vents e.g., 610, 612, 614 can be rigidly fixed to the outer housings at strategic locations along the length of the outer housing 600. The upper vent 610, which is positioned on the outside of the bellows assembly is a stainless steel wire cloth that is used for filtering solid particulates from entering the pressure balancing bellow. The other vents 612, 614 can be used to vent selected areas of the sensor head. FIG. 11B shows an enlarged view of a welded mesh, e.g., 610. Just above the top outer housing, a connector ring (not shown) mounts to the top support rods of the fourth cylindrical assembly, which is responsible for the connection to the electronics bay.

The disclosed sensor head accomplishes navigation and well inspection functionality in an especially advantageous way. The ultrasonic transducers included in the sensor head enable obstacle avoidance while wirelessly relaying a live point cloud data to the surface for real-time, 3D mapping of the well. The wobbler transducer which is capable of a pulse/echo measurement articulated about two degrees of freedom, pan and tilt, for increased measurement visibility and precision, while the caliper transducers can pan with a complete 360-degree range.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components or steps described and illustrated with reference to the figures are required for all embodiments or arrangements.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and "comprising", when used in this specification, specify the presence of stated features, integers, steps, operations, elements, or components, but do not preclude the presence or addition of one or more other features, integers, steps, operations, elements, components, or groups thereof.

Terms of orientation are used herein merely for purposes of convention and referencing and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An autonomous downhole robot (ADR) tool string having an extended longitudinal axis that is configured for navigating and collecting information in a downhole environment, the ADR tool string comprising:
   a sensor head having a cylindrical housing positioned at a distal end of the tool string including:
      a wobbler ultrasonic transducer comprising a tubular structure housing an ultrasonic transducer, the tubular structure being coupled to a distal end of the sensor head via a shaft orientated orthogonally to the longitudinal axis of the tool string wherein the tubular structure is tiltable about the shaft, and wherein the distal end of the sensor head is mounted for panned movement about the longitudinal axis providing two degrees of freedom for the wobbler ultrasonic transducer; and
      first and second caliper ultrasonic transducers positioned on the cylindrical housing facing the downhole environment, each being configured to pan about an axis orthogonal to the longitudinal axis of the tool string; and
   an electronics bay section coupled to the sensor head including electronic circuits for controlling components of the sensor head.

2. The ADR tool string of claim 1, wherein the wobbler ultrasonic transducer is configured to tilt with 180 range and to pan with a range of 360 degrees.

3. The ADR tool string of claim 1, wherein the first and second caliper ultrasonic transducers are configured to pan with a range of 360 degrees.

4. The ADR tool string of claim 1, wherein the sensor head comprises:
   a) a transducer housing assembly positioned at a distal end of the tool string, the transducer housing assembly including the wobbler ultrasonic transducer and the first and second caliper ultrasonic transducers;
   b) a tilt motor housing assembly coupled adjacent to the transducer housing assembly including a tilt motor that is operable to tilt the wobbler transducer;
   c) a pan motor housing assembly coupled adjacent to the tilt motor housing assembly including a pan motor that is operable to pan the wobbler transducer and the first and second caliper transducers; and
   d) a bellows assembly coupled adjacent to the pan motor housing assembly including a bellows that is operable to balance pressure within the sensor head.

5. The ADR tool string of claim 4, wherein the transducer housing assembly further includes a plurality of drivetrain components coupled, directly or indirectly, to the shaft of the wobbler transducer and to the tilt motor.

6. The ADR tool string of claim 5, wherein drivetrain of the transducer housing assembly includes: i) an output spur gear coupled to the shaft of the wobbler transducer, ii) an idler spur gear that engages with the output spur gear, and iii) an input spur gear that engages with the idler spur gear and is coupled to the tilt motor.

7. The ADR tool string of claim 6, wherein the input spur gear is coupled to the tilt motor via a worm output gear that is driven by a worm which is coupled to a tilt spur gear.

8. The ADR tool string of claim 4, wherein the tilt motor housing assembly further includes planetary gear head that is coupled to the tilt motor and is coupled via a shaft to transducer housing assembly, a pan axis internal spur gear that is coupled to the pan motor of the pan motor housing assembly, and a tilt positioning sensor.

9. The ADR tool string of claim 4, wherein the pan motor housing assembly further includes planetary gearhead that is coupled via a shaft to the tilt motor housing assembly, a pan positioning sensor, an end cap for coupling with the bellows assembly, and a pressure transducer.

10. The ADR tool string of claim 4, wherein the bellows assembly further includes support rods that couple the bellows assembly to the pan motor housing assembly and a filter.

11. An autonomous downhole robot (ADR) tool string having an extended longitudinal axis that is configured for navigating and collecting information in a downhole environment, the ADR tool string comprising:
   a sensor head having a cylindrical housing positioned at a distal end of the tool string including:
      a) a transducer housing assembly positioned at a distal end of the tool string, the transducer housing assembly including a wobbler ultrasonic transducer having two degrees of freedom for tilting and panning and first and second caliper ultrasonic transducers having a single degree of freedom for panning;
      b) a tilt motor housing assembly coupled adjacent to the transducer housing assembly including a tilt motor that is operable to tilt the wobbler transducer;
      c) a pan motor housing assembly coupled adjacent to the tilt motor housing assembly including a pan motor that is operable to pan the wobbler transducer and the first and second caliper transducers; and
      d) a bellows assembly coupled adjacent to the pan motor housing assembly including a bellows that is operable to balance pressure within the sensor head.

12. The ADR tool string of claim 11, wherein the wobbler ultrasonic transducer is configured to tilt with 180 range and to pan with a range of 360 degrees.

13. The ADR tool string of claim 11, wherein the first and second caliper ultrasonic transducers are configured to pan with a range of 360 degrees.

14. The ADR tool string of claim 11, wherein the transducer housing assembly further includes a plurality of drivetrain components coupled, directly or indirectly, to the shaft of the wobbler transducer and to the tilt motor.

15. The ADR tool string of claim 14, wherein drivetrain of the transducer housing assembly includes: i) an output spur gear coupled to the shaft of the wobbler transducer, ii) an idler spur gear that engages with the output spur gear, and iii) an input spur gear that engages with the idler spur gear and is coupled to the tilt motor.

16. The ADR tool string of claim 15, wherein the input spur gear is coupled to the tilt motor via a worm output gear that is driven by a worm which is coupled to a tilt spur gear.

17. The ADR tool string of claim 11, wherein the tilt motor housing assembly further includes planetary gear head that is coupled to the tilt motor and is coupled via a shaft to transducer housing assembly and a pan axis internal spur gear that is coupled to the pan motor of the pan motor housing assembly.

18. The ADR tool string of claim 11, wherein the pan motor housing assembly further includes planetary gearhead that is coupled via a shaft to the tilt motor housing assembly, a pan positioning sensor, an end cap for coupling with the bellows assembly, and a pressure transducer.

19. The ADR tool string of claim 11, wherein the bellows assembly further includes support rods that couple the bellows assembly to the pan motor housing assembly and a filter.

20. The ADR tool string of claim 11, further comprising an outer housing surrounding the transducer housing assembly, tilt motor housing assembly, pan motor housing assembly and bellows assembly, wherein the outer housing includes a plurality of vents.

\* \* \* \* \*